United States Patent Office 3,515,753
Patented June 2, 1970

3,515,753
PENTAFLUOROCINNAMANILIDE DERIVATIVES
Jack Bernstein and Harry Louis Yale, New Brunswick, N.J., assignors to E. R. Squibb & Sons, Inc., New York, N.Y., a corporation of Delaware
No Drawing. Filed Jan. 8, 1968, Ser. No. 696,093
Int. Cl. C07c 103/38
U.S. Cl. 260—558
9 Claims

ABSTRACT OF THE DISCLOSURE

This invention relates to new (2,3,4,5,6-pentafluorophenyl)acryloylanilide compounds of the formula

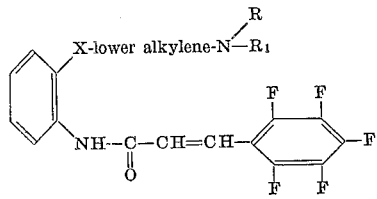

and their salts, which are useful as immunosuppressive agents.

SUMMARY OF THE INVENTION

This invention relates to aminoalkylthio and aminoalkoxy - (2,3,4,5,6 - pentafluorophenyl)acryloylanilides of the formula (I)

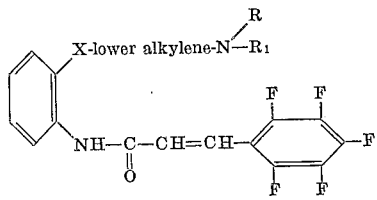

and their salts.

R and $R_1$ in Formula I are hydrogen, lower alkyl or aralkyl and X is oxygen or sulfur. The lower alkyl and lower alkylene groups are straight or branched hydrocarbon chains of up to about seven carbon atoms. The aralkyl groups are preferably phenyl-lower alkyl groups such as benzyl, phenethyl and the like, and simply substituted phenyl-lower alkyl groups, i.e., wherein the phenyl ring bears 1 or 2 halogens, especially chlorine or bromine, lower alkyl, lower alkoxy or amino groups.

The salts include acid addition salts with inorganic and organic acids. Such salts include, for example, the hydrohalides, e.g., hydrochloride, hydrobromide, etc., sulfate, nitrate, phosphate and the like, and salts from organic acids like citrate, acetate, oxalate, pamoate, maleate, fumarate, tartrate, succinate, methanesulfonate, benzenesulfonate, toluenesulfonate, etc. The bases of Formula I also form quaternary ammonium salts, e.g., with alkylating agents such as alkyl halides, alkylsulfates, alkylsulfonates, arylsulfonates, for example, methiodide, methochloride, ethiodide, methylsulfate, methanesulfonate, toluenesulfonate and the like. Such salts are frequently useful in recovering and isolating the compound from the reaction mixture in which it is produced, e.g., by precipitating the salt in a liquid medium in which it is insoluble.

The compounds of Formula I, in which R and $R_1$ are lower alkyl or aralkyl, are produced by reacting a pentafluorocinnamoyl halide, such as the chloride with a substituted o-aminoalkylthioaniline or a substituted o-aminoalkoxyaniline in an aprotic solvent such as chloroform. The compounds of Formula I, in which one or both of the substituents, R and $R_1$ are hydrogen, are produced by reacting the appropriate o-aminoalkylthioaniline or o-aminoalkoxyaniline, in which the amino group is protected, e.g., as a phthalimido or a benzylmethylamino group, with a pentafluorocinnamoyl halide in an aprotic solvent, and then removing the protecting group by treatment with hydrazine or ethyl chloroformate, followed by hydrolysis.

The compounds of this invention may be used as immunosuppressive agents, i.e., to suppress the immune response which is a defensive mechanism in animal species against foreign bodies. Thus they may be used, for example, in preventing rejection of organ transplants or skin grafts such as renal transplants or skin grafts in dogs or mice or in suppressing the antibody response in mice to an injection of red blood cells of sheep. The compounds may be administered orally or parenterally, e.g., subcutaneously, in amounts of about 2 to 10 mg./kg. daily in single doses or two to four divided doses. These compounds are similar in action and dosage to azathioprine but may be used at higher dosage and for longer periods, if desired, because of lower toxicity and greater specificity of action.

The following examples are illustrative of the invention. Temperatures are expressed in degrees centigrade.

EXAMPLE 1

(a) Pentafluorocinnamoyl chloride 5.0 grams of pentafluorocinnamic acid suspended in 50 ml. of thionyl chloride are stirred at room temperature until evolution of HCl ceases (0.33 hour). The reaction mixture is then warmed slowly to reflux and heated under reflux for two hours. A clear solution forms almost immediately on heating. The thionyl chloride is removed in vacuo, the viscous residue is dissolved in dry benzene, filtered, the benzene removed by distillation, and the residue is fractionated to yield the desired pentafluorocinnamoyl chloride, B.P. 108–109° (8 mm.).

(b) 2' - {[3 - (dimethylamino)propyl]thio} - 2,3,4,5,6-cinnamanilide hydrochloride At room temperature a solution of 2.1 grams of o-[3-(dimethylamino)propylthio]aniline, in 20 ml. of dry chloroform are added dropwise at 25° to a solution of 2.3 grams of pentafluorocinnamoyl chloride in 30 ml. of dry chloroform. A white crystalline precipitate forms quickly but this redissolves after about one-fifth of the amine has been added. The temperature rises spontaneously to 36°. The reaction mixture is stirred at room temperature for 0.5 hour and then heated under reflux for two hours. The solution is cooled and the chloroform is removed in vacuo on the rotary evaporator. The viscous residue is dissolved in 30 ml. of dry acetonitrile and about 80 ml. of anhydrous ether are added. The crystalline precipitate which separates is filtered and washed with anhydrous ether to yield about 3.2 grams of 2'-{[3-(dimethylamino)propyl]thio}-2,3,4,5,6-pentafluorocinnamanilide hydrochloride, melting at about 160–163°. After recrystallization from acetonitrile the compound melts at 165–167°.

The base is obtained by dissolving the hydrochloride in warm water and treating the solution with an excess of solid sodium bicarbonate. The mixture is extracted with ether, the ether extracts dried over anhydrous potassium carbonate, filtered, and the filtrate concentrated to yield the desired base as a solid, melting at 74–75° after crystallization from hexane.

EXAMPLE 2

2'-[3-(dimethylamino)propyl]-2,3,4,5,6-pentafluorocinnamanilide

To a solution of 12.8 grams of pentafluorocinnamoyl chloride in 200 ml. of anhydrous chloroform there is added dropwise, with vigorous stirring, a solution of 9.7 grams of o-(3-dimethylamino)propoxyaniline in 100 ml. of anhydrous chloroform. The temperature of the reaction mixture rises from 25° to about 35° during the addition, and a white solid precipitates from the mixture. The mixture is then heated under reflux, with stirring, for two hours, cooled, and the solid filtered. The crude product after washing with ether, melts at 226–228°; the pure product after crystallization from isopropanol, melts at 230–232°.

The base is obtained by dissolving the hydrochloride in water, treating with dilute aqueous sodium hydroxide and extracting the mixture with ether. The dried and filtered ether solution is concentrated to yield the base, melting at 136–137°, after crystallization from cyclohexane.

EXAMPLE 3

2′-{[3-(dimethylamino)propyl]thio}-2,3,4,5,6-pentafluorocinnamanilide methiodide To a solution of 5.0 grams of 2′-{[3-(dimethylamino)propyl]thio}-2,3,4,5,6-pentafluorocinnamanilide in 200 ml. of acetonitrile there is added 2.0 grams of methyl iodide and the reaction mixture is allowed to remain at room temperature for 48 hours. After the addition of 500 ml. of anhydrous ether, the precipitate is filtered, washed with anhydrous ether, and air-dried to give the product.

Following the procedure of Example 1, but employing the appropriate substituted anilines instead of o-[3-(dimethylamino)propyl]-thioaniline there are obtained the following 2′-substituted - 2,3,4,5,6 - pentafluorocinnamanilide.

| Example | o-Z-thioaniline (Z) | 2′-Z′-2,3,4,5,6-penta-fluoro-cinnamanilide (Z)′ |
|---|---|---|
| 4 | 2-dimethylaminoethyl | 2-dimethylaminoethylthio. |
| 5 | 3-(diethylamino)propyl | 3-(diethylamino)propylthio. |
| 6 | 2-(diallylamino)ethyl | 2-(diallylamino)ethylthio. |
| 7 | 2-(N-benzyl-N-methylamino)-ethyl | 2-(N-benzyl-N-methylamino)-ethylthio. |
| 8 | 2-(N-methyl-N-phenethylamino)ethyl | 2-(N-methyl-N-phenethylamino)ethylthio. |

EXAMPLE 9

(a) 2′-(2-phthalimidoethylthio)-2,3,4,5,6-pentafluorocinnamanilide

To a solution of 25.6 grams of 2,3,4,5,6-pentafluorocinnamyl chloride in 200 ml. of anhydrous chloroform, cooled to 10°, there is added dropwise, with vigorous stirring, a solution of 30.0 grams of N-[2-(o-aminophenylthio)ethyl]phthalimide and 10 grams of triethylamine in 150 ml. of anhydrous chloroform. The reaction mixture is stirred for one hour at room temperature and is then heated under reflux for an additional hour. The cooled reaction mixture is washed with water, dried over anhydrous magnesium sulfate, filtered, the filtrate concentrated and the residue diluted with hexane. The solid is filtered and washed with hexane to give the product which, without further treatment is used directly in part (b).

(b) 2′-(2-aminoethylthio)-2,3,4,5,6-pentafluorocinnamanilide hydrochloride

To a solution of 15.0 grams of 2′-(2-phthalimidoethylthio)-2,3,4,5,6-pentafluorocinnamanilide in 160 ml. of chloroform and 80 ml. of methanol there is added 4.0 grams of 85% hydrazine hydrate. The reaction mixture is allowed to remain at room temperature overnight and is then concentrated under reduced pressure. The residue is suspended in water and the mixture made strongly alkaline with a 40% potassium hydroxide solution. The liberated amine is extracted from the mixture with ether and the ether extract dried over anhydrous magnesium sulfate.

The filtered solution is treated with an ethereal solution of hydrogen chloride and the precipitated solid is filtered and washed with anhydrous ether. The 2′-(2-aminoethylthio)-2,3,4,5,6 - pentafluorocinnamanilide hydrochloride thus obtained is purified by crystallization from a mixture of isopropanol and ether.

EXAMPLE 10

(a) 2′-{2-[N-carboethoxy-N-methylamino]ethylthio}-2,3,4,5,6-pentafluorocinnamanilide To a solution of 36.0 grams of 2′-(2-N-benzyl-N-methylaminoethylthio)cinnamanilide in 350 ml. of anhydrous benzene there is added a solution of 20.0 grams of ethyl chloroformate in 80 ml. of anhydrous benzene and the mixture is refluxed for 24 hours. The cooled reaction mixture is washed with 5% hydrochloric acid and with water. The benzene solution is dried over anhydrous magnesium sulfate and is then concentrated and finally heated at 80–90° at 1 mm. The oily product is used in step (b) without further purification.

(b) 2′-(2-methylaminoethylthio)-2,3,4,5,6-pentafluorocinnamanilide hydrochloride To a solution of 30.0 grams of 2′-{2-[2-carboethoxy-N-methylamino]ethylthio} - 2,3,4,5,6 - pentafluorocinnamanilide in 100 ml. of glacial acetic acid there is added 90 ml. of a 32% hydrogen bromide in acetic acid solution. The reaction mixture is allowed to stand at room temperature for 72 hours and is then poured, with vigorous stirring and cooling, into one liter of anhydrous ether. The ether layer is decanted and the residual material dissolved in water. The aqueous solution is made alkaline by the addition of aqueous sodium hydroxide and the mixture is extracted several times with ether. The ether extracts are dried over anhydrous potassium carbonate, filtered and treated with an ethereal solution of hydrogen chloride. The precipitated solid is filtered, washed with ether, and crystallized, first from acetone and then from acetonitrile to yield the desired 2′-(2-methylaminoethylthio)-2,3,4,5,6-pentafluorocinnamanilide hydrochloride.

By converting the appropriately substituted o-aminophenol to the corresponding o-amino(alkoxyaniline) and then proceeding as described in Example 2, utilizing this substance instead of o-(3-dimethylamino)propoxyaniline, products corresponding to those in Examples 1 and 3 to 10, respectively, wherein there is an oxygen instead of a sulfur (compounds corresponding to Formula I wherein X is oxygen instead of sulfur) are obtained.

What is claimed is:
1. A compound of the formula

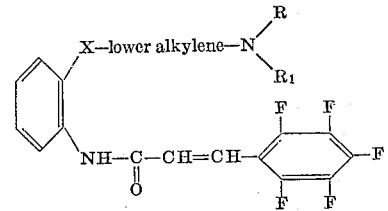

wherein X is oxygen or sulfur and R and $R_1$ each is hydrogen, lower alkyl or phenyl loweralkyl and acid addition salts and quaternary ammonium salts thereof.

2. A compound as in claim 1 wherein R and $R_1$ each is lower alkyl.

3. A compound as in claim 2 wherein X is sulfur.

4. A compound as in claim 2 wherein X is oxygen.

5. A compound as in claim 3 wherein each lower alkyl group is methyl and the lower alkylene group has three carbon atoms.

6. A compound as in claim 4 wherein each lower alkyl group is methyl and the lower alkylene group has three carbon atoms.

7. A compound as in claim 1 wherein R and $R_1$ each is phenyllower alkyl.

8. A compound as in claim 1 wherein R is lower alkyl and $R_1$ is phenyllower alkyl.

9. A compound as in claim 8 wherein R is methyl and $R_1$ is benzyl.

References Cited

UNITED STATES PATENTS 3,201,401  8/1965  Krapcho _____ 260—562

HENRY R. JILES, Primary Examiner

H. I. MOATZ, Assistant Examiner

U.S. Cl. X.R.

260—326, 472, 544; 424—324

PO-1050
(5/69)

UNITED STATES PATENT OFFICE
CERTIFICATE OF CORRECTION

Patent No. 3,515,753　　　　　　　　　Dated　June 2, 1970

Inventor(s) Jack Bernstein and Harry L. Yale

It is certified that error appears in the above-identified patent and that said Letters Patent are hereby corrected as shown below:

Column 2, line 40, before "cinnamanilide" insert --pentafluoro--; and on line 68, "propyl" should read --propoxy--. Column 3, line 34, "penta-fluoro" should read --pentafluoro--. Column 4, line 75, "phenyllower" should read --phenyl lower--.

SIGNED AND
SEALED
NOV 24 1970

(SEAL)
Attest:

Edward M. Fletcher, Jr.
Attesting Officer

WILLIAM E. SCHUYLER, JR.
Commissioner of Patents